US012566072B2

(12) United States Patent
Nakashima et al.

(10) Patent No.: US 12,566,072 B2
(45) Date of Patent: Mar. 3, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Toyokazu Nakashima, Nagoya (JP); Kazuhiro Nishimura, Shizuoka-ken (JP); Yoshie Sakakibara, Okazaki (JP); Hirotaka Nogami, Nisshin (JP); Makoto Tamura, Miyoshi (JP); Daigo Ichikawa, Nisshin (JP); Shintaro Matsutani, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 18/378,687

(22) Filed: Oct. 11, 2023

(65) Prior Publication Data

US 2024/0159549 A1    May 16, 2024

(30) Foreign Application Priority Data

Nov. 14, 2022    (JP) ................................. 2022-182084

(51) Int. Cl.
*G01C 21/34* (2006.01)
*G01C 21/36* (2006.01)
*G06V 20/10* (2022.01)
*G06V 20/13* (2022.01)

(52) U.S. Cl.
CPC ..... *G01C 21/3461* (2013.01); *G01C 21/3602* (2013.01); *G01C 21/3617* (2013.01); *G01C*

*21/3647* (2013.01); *G06V 20/13* (2022.01); *G06V 20/182* (2022.01)

(58) Field of Classification Search
CPC ........... G01C 21/3461; G01C 21/3602; G01C 21/3617; G01C 21/3647; G01C 21/3484; G01C 21/3815; G01C 21/3852; G06V 20/13; G06V 20/182; G08G 1/0104; G08G 1/048; G08G 1/0967
See application file for complete search history.

(56) References Cited

U.S. PATENT DOCUMENTS

2009/0256741 A1 * 10/2009 Takashi ............... G01S 13/9023
2013/0013204 A1    1/2013 Kazama et al.
2021/0024089 A1    1/2021 Ito et al.
2022/0065639 A1 *  3/2022 Henry ................ G01C 21/3446

FOREIGN PATENT DOCUMENTS

JP    2005-078566 A    3/2005
JP    2006300571 A  * 11/2006    ......... G01C 21/3461
JP    2010176506 A  *  8/2010    ............. G01C 21/00
JP    2013-019683 A    1/2013
JP    2021-018715 A    2/2021

* cited by examiner

*Primary Examiner* — Rachid Bendidi
*Assistant Examiner* — Kirsten Jade M Santos
(74) *Attorney, Agent, or Firm* — Dinsmore & Shohl LLP

(57) ABSTRACT

Provided is an information processing device that includes at least one processor, wherein the at least one processor is configured to: acquire a satellite image of the ground, which is captured by an artificial satellite, for a target area based on disaster information; based on the satellite image, detect an obstruction on a road which relates to passage of a vehicle; and output a road for which no obstruction is detected as a traversable road.

3 Claims, 4 Drawing Sheets

FIG.2

INFORMATION PROCESSING DEVICE AND INFORMATION PROCESSING METHOD

CROSS-REFERENCE TO RELATED APPLICATION

This application is based on and claims priority under 35 USC 119 from Japanese Patent Application No. 2022-182084 filed on Nov. 14, 2022, the disclosure of which is incorporated by reference herein.

BACKGROUND

Technical Field

The present disclosure relates to an information processing device and an information processing method.

Related Art

Japanese Patent Application Laid-Open (JP-A) No. 2010-176506 discloses an information transmitting and receiving system that performs route guidance for a moving body, and also switches to a route guidance method based on disaster information when a disaster occurs.

This document proposes receiving travel histories of roads to determine a traversable road.

Note that the technology described in Japanese Patent Application Laid-Open (JP-A) No. 2010-176506 cannot determine whether or not a road in a disaster area is traversable until after a vehicle has travelled on the road, and therefore, there is room for improvement regarding promptly proposing a traversable road.

SUMMARY

In consideration of the above facts, an object of the present disclosure is to provide an information processing device and an information processing method which are capable of promptly proposing a traversable road based on an overhead view of a road condition.

An information processing device according to a first aspect of the present disclosure includes: an acquisition section that is configured to acquire a satellite image of the ground, which is captured by an artificial satellite, for a target area based on disaster information; a detection section that is configured to, based on the satellite image acquired by the acquisition section, detect an obstruction on a road which relates to passage of a vehicle; and an output section that is configured to output a road for which no obstruction is detected by the detection section as a traversable road.

The information processing device according to the first aspect of the present disclosure acquires a satellite image of the ground, which is captured by an artificial satellite, for a target area based on disaster information. Then, based on the satellite image, an obstruction on a road which relates to passage of a vehicle is detected, and a road for which no obstruction is detected is output as a traversable road. As a result, a traversable road can be promptly proposed based on an overhead view of a road condition, even at a timing when a travel history for the target area cannot be obtained at the time of a disaster.

An information processing device according to a second aspect of the present disclosure is the configuration of the information processing device according to the first aspect, wherein: the acquisition section is configured to acquire a satellite image captured before a disaster occurs and a satellite image captured after the disaster occurs, for the target area; and the detection section is configured to detect the obstruction on the road which relates to passage of the vehicle by comparing the satellite image captured before a disaster occurs and the satellite image captured after the disaster occurs.

The information processing device according to the second aspect of the present disclosure acquires a satellite image captured before a disaster occurs and a satellite image captured after the disaster occurs, for a target area. The satellite image captured before a disaster occurs and the satellite image captured after the disaster occurs are compared to detect an obstruction on the road which relates to passage of the vehicle. This enables a change in a road condition before and after the occurrence of a disaster to be accurately captured, thereby enabling a more accurate proposal of a traversable road.

An information processing device according to a third aspect of the present disclosure is the configuration of the information processing device according to the first aspect or the second aspect, wherein the acquisition section is configured to acquire a satellite image captured during daytime and a satellite image captured at night, for the target area; the detection section is configured to, based on the satellite image captured at night, set a priority in accordance with a luminance, which indicates a road brightness, with respect to roads of the target area; and the detection section is configured to, based on the satellite image captured during daytime, detect obstructions on roads which relate to passage of the vehicle, in order from a highest priority road.

The information processing device according to a third aspect of the present disclosure acquires a satellite image captured during daytime and a satellite image captured at night, for a target area. Then, based on the satellite image captured at night, a priority in accordance with a luminance, which indicates a road brightness, with respect to roads of the target area is set, and based on the satellite image captured during daytime, obstructions on roads which relate to passage of the vehicle are detected, in order from a highest priority road. Note that on a road with low luminance in a satellite image captured at night, there may be less road lighting, and it is assumed that there is a high risk of a secondary disaster occurring while driving at night without being aware of an obstruction on the road. Accordingly, in the present exemplary embodiment, for example, the priority is set high for roads with low luminance, and obstructions on roads which relate to passage of the vehicle are preferentially detected, enabling the risk of secondary disasters during a disaster to be effectively reduced.

An information processing device according to a fourth aspect of the present disclosure is the configuration of the information processing device of the first aspect or the second aspect, wherein: the acquisition section is configured to acquire a travel history of vehicles having a size of the vehicle used by a user, for roads of the target area; the output section is configured to output a traversable road in accordance with a request from the user; and in a case in which plural roads are output as traversable roads, the output section is configured to, based on a travel history after a disaster occurs, preferentially output a road with a highest travel history of vehicles having a size of the vehicle used by the user.

The information processing device according to a fourth aspect of the present disclosure outputs a traversable road in response to a request from a user. Here, the information processing device acquires a travel history of vehicles having a size that corresponds to the size of the vehicle, for roads in the target area. Moreover, in a case in which plural roads are output as traversable roads as a result of detection of obstructions on roads which relate to passage of a vehicle, the information processing device preferentially presents a road with a highest travel history of vehicles having a size of the vehicle used by the user based on a travel history after a disaster occurs. This enables the user to easily select a road that has a travel history of vehicles having a size that corresponds to the size of the host vehicle. As a result, for example, users using transportation trucks are prevented from having unexpected stops due to a change in a road condition due to a disaster, thereby enabling the distribution of goods to be easily ensured during the time of a disaster.

As described above, the information processing device and the information processing method according to the present disclosure can promptly propose a traversable road based on an overhead view of a road condition.

BRIEF DESCRIPTION OF THE DRAWINGS

Exemplary embodiments of the present disclosure will be described in detail based on the following figures, wherein:

FIG. 2 is a block diagram illustrating a hardware configuration of an information processing device;

DETAILED DESCRIPTION

Explanation follows regarding a system S according to an exemplary embodiment of the present disclosure, with reference to FIG. 1 to FIG. 4. The system S according to the present exemplary embodiment is a system that views a road condition from overhead and proposes a traversable road.

Figure 1:
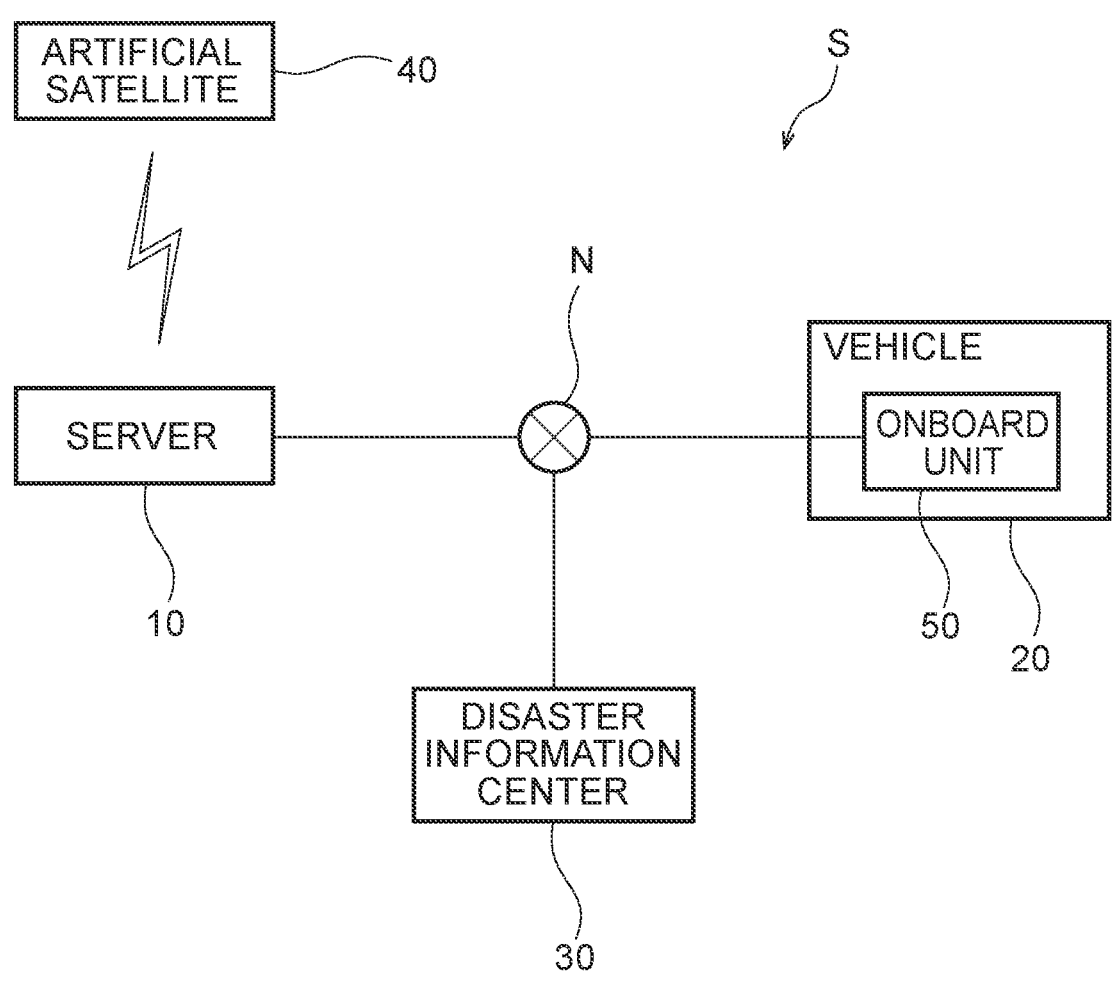
FIG. 1 is a diagram illustrating a schematic configuration of a system configured by an information processing device according to an exemplary embodiment of the present disclosure.

As illustrated in FIG. 1, the system S includes a server 10, a vehicle 20, a disaster information center 30, and an artificial satellite 40. In the system S, the server 10, the vehicle 20, and the disaster information center 30 are connected via a network N.

The server 10 is a server computer. The server 10 acquires an image (hereinafter also referred to as a "satellite image"), which is captured by the artificial satellite 40, from the artificial satellite 40. Note that the satellite image may be, for example, an image in which a range from 0.5 km to 20 km square on the ground is set as an image capturing target. The server 10 is an example of an information processing device.

The vehicle 20 includes an onboard unit 50 that is connected to the server 10 via the network N. Although only one vehicle 20 is illustrated in FIG. 1, in actuality, plural vehicles 20 are connected via the network N.

The disaster information center 30 is a public organization that distributes disaster information indicating a disaster area, a disaster situation, and the like when a disaster occurs, via a wide area communication network.

The artificial satellite 40 orbits on the earth's orbit at a predetermined cycle and captures images of the ground. The number of times that the artificial satellite 40 orbits the earth on one day, the altitude of the orbit of the artificial satellite 40, and the like are arbitrary. Although FIG. 1 illustrates only one artificial satellite 40, in some embodiments, the artificial satellite 40 is configured by plural artificial satellites capable of capturing images of the same location on the ground.

Figure 2:
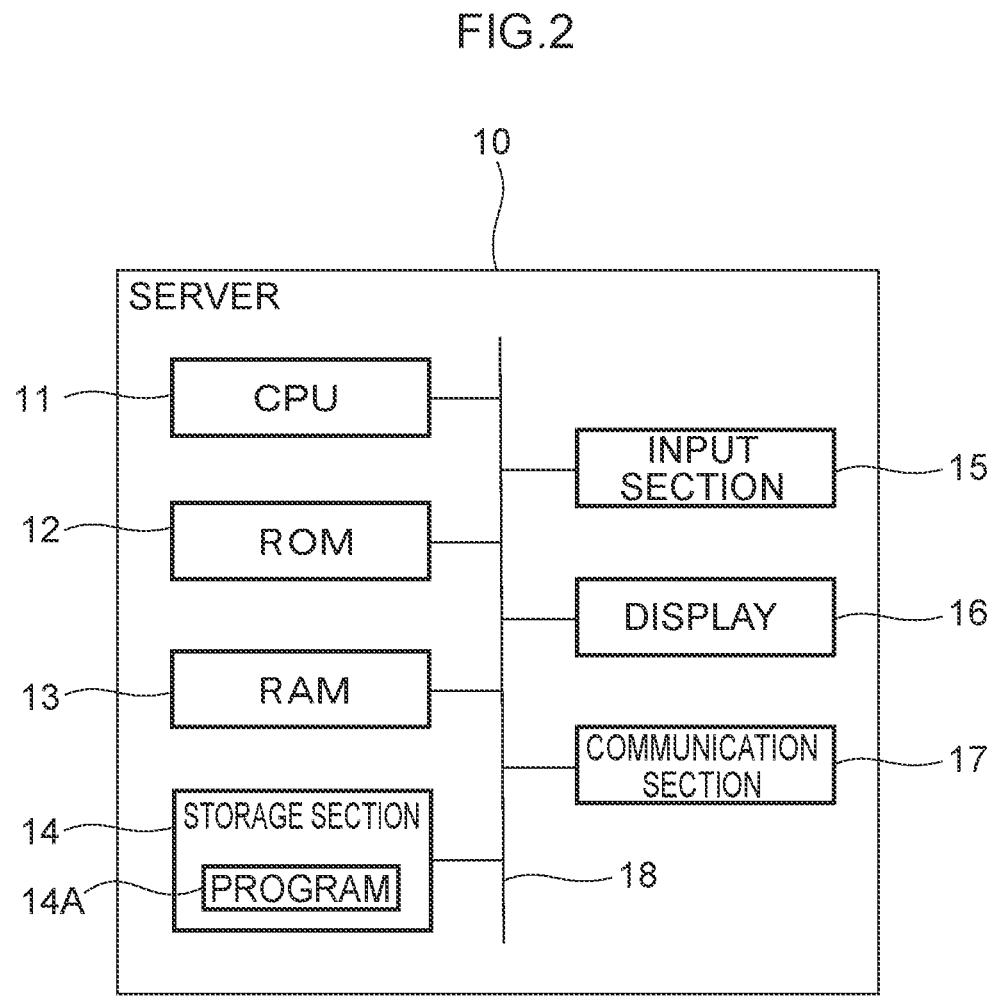

Explanation follows regarding a hardware configuration of the server 10. FIG. 2 is a block diagram illustrating a hardware configuration of the server 10.

As illustrated in FIG. 2, the server 10 includes a central processing unit (CPU) 11, read only memory (ROM) 12, random access memory (RAM) 13, a storage section 14, an input section 15, a display 16, and a communication section 17. These respective components are connected so as to be capable of communicating with each other via a bus 18.

The CPU 11 is a central processing unit that executes various programs and controls various components. Namely, the CPU 11 reads a program from the ROM 12 or the storage section 14, and executes the program using the RAM 13 as a workspace. The CPU 11 controls the respective configurations described above and performs a variety of computation processing in accordance with programs stored in the ROM 12 or the storage section 14.

The ROM 12 stores various programs and various data. The RAM 13 serves as a workspace to temporarily store programs and data.

The storage section 14 is configured by a storage device such as a hard disk drive (HDD), a solid state drive (SSD), or flash memory, and stores various programs as well as various data. The storage section 14 stores a program 14A for causing the CPU 11 to execute output processing, which is described below.

The input section 15 includes a pointing device such as a mouse, a keyboard, a microphone, a camera, and the like, and is used to perform various input.

The display 16 is, for example, a liquid crystal display, and displays various information. The display 16 may employ a touch panel method to function as the input section 15.

The communication section 17 is an interface for communicating with other devices. For example, a wired communication standard such as Ethernet (registered trademark) or FDDI, or a wireless communication standard such as 4G, 5G, Bluetooth (registered trademark), or Wi-Fi (registered trademark) is used for this communication. The communication section 17 is connected to the network N.

Figure 3:
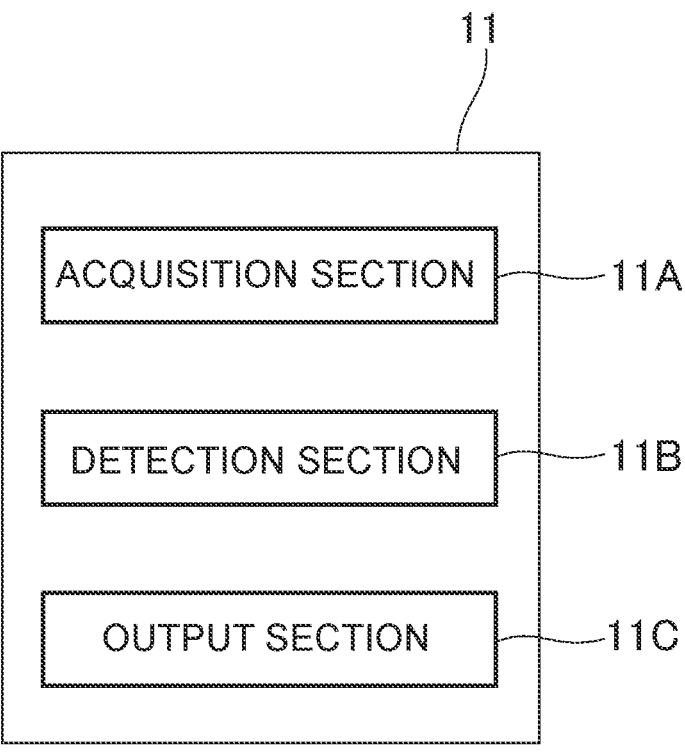
FIG. 3 is a block diagram illustrating an example of a functional configuration of an information processing device.

Next, explanation follows regarding a functional configuration of the server 10. FIG. 3 is a first block diagram illustrating an example of a functional configuration of the server 10.

An acquisition section 11A acquires disaster information that is transmitted from the disaster information center 30 when a disaster occurs. This disaster information includes a disaster area, a disaster situation, and the like.

The acquisition section 11A acquires user information that is transmitted from the onboard unit 50 of the vehicle 20. The user information is information transmitted from the onboard unit 50 to the server 10 when, for example, a request from a user for road information of a road that is traversable is received at the onboard unit 50 in a case of the occurrence of a disaster. The user information includes information relating to the vehicle 20 used by the user, and the information relating to the vehicle 20 includes position information for the vehicle 20 and vehicle type information for the vehicle 20. Note that the user information may be stored in advance in the server 10.

The acquisition section 11A acquires satellite images that are obtained by the artificial satellite 40 capturing images of the ground. More specifically, a satellite image capturing a target area based on the disaster information is acquired.

The satellite images acquired by the acquisition section 11A include a satellite image that is captured before a disaster occurs and a satellite image captured after the disaster occurs, for a target area based on the disaster information. This is in order to facilitate the identification of locations at which there is a change in a road condition by comparing satellite images captured of the same area before and after a disaster occurs.

Moreover, the satellite images acquired by the acquisition section 11A include a satellite image captured at night, for a target area based on the disaster information. This is in order to identify, from the satellite images, luminance, which indicates a road brightness at night, with respect to roads within the target area. Accordingly, it can be understood that roads with low luminance, which indicates a road brightness, are roads with less night-time traffic and less road lighting. Accordingly, it is assumed that a risk of a user not realizing an obstruction on a road when driving at night and a secondary disaster occurring is high for a road with a low luminance, which indicates a road brightness.

The acquisition section 11A acquires map data of the target area based on the disaster information. This map data is referred to in order to extract a road area included in the satellite image. Although the road area included in the satellite image can be extracted by image analysis based on only the satellite image, in some embodiments, referencing the map data is useful in the respect that the road area can be accurately extracted even at locations at which, for example, a portion of a road division line is hidden by a roadside tree or the like and cannot be captured. Note that the map data may be stored in advance in the server 10.

The acquisition section 11A acquires travel histories for roads in a target area based on disaster information, which are correlated to the size of the vehicle. As an example, these travel histories are acquired by correlating the position information for the vehicle 20 and the vehicle type information of the vehicle 20, which are transmitted from the onboard unit 50. Note that the travel histories may be stored in advance in the server 10.

Note that a target area based on the disaster information is, for example, an area certified by the disaster information center 30 as a disaster area. The target area may include an area in which the occurrence of a disaster is predicted in accordance with the type of the disaster.

A detection section 11B detects an obstruction on a road which relates to passage of the vehicle, based on the satellite images acquired by the acquisition section 11A. As an example, the detection section 11B refers to the map data of a target area based on the disaster information, and extracts a road area from a satellite image obtained by capturing an image of the target area. The detection section 11B uses known image recognition technology to detect an obstruction on a road which relates to passage of the vehicle in an area extracted from the satellite image as a road area. Note that an obstruction on a road which relates to passage of a vehicle includes, for example, a case in which an obstruction such as a collapsed object is present on a road, or flooding of a road.

Here, based on the satellite image captured at night, the detection section 11B sets the priority of obstruction detection for the roads in the target area, and detects an obstruction on roads in order from a highest priority road. More specifically, the luminance, which indicates a road brightness at night, is identified for roads in the target area, and the priority of the roads is set so as to be higher as the luminance of the road is lower. This enables the priority of roads with less road certification and a high risk of secondary disasters occurring during driving at night to be set high.

Note that in the present exemplary embodiment, from the standpoint of achieving promptness of provision of information, a satellite image captured at night before a disaster occurs is used. In this regard, immediately after a disaster occurs, a satellite image taken at night before the disaster occurred may be used, and then a satellite image taken at night after the disaster has occurred may be used. This enables the risk of a secondary disaster to be predicted more accurately in response to a change in the situation after a disaster occurs.

The detection section 11B detects an obstruction on a road which relates to passage of a vehicle by comparing a satellite image captured before a disaster occurs and a satellite image captured after the disaster occurs, for the target area based on disaster information. More specifically, the detection section 11B extracts changes in the characteristic points of the road area extracted from the satellite images, the characteristic points being obtained by comparing an image before a disaster occurs and an image after the disaster occurs. As a result, for example, a road line is continuous in a satellite image before a disaster occurs, but in a satellite image after the disaster occurs, a location or the like at which the same road line is discontinuous is identified as a location at which an obstruction has been detected. This enables the erroneous recognition of a location at which the same road line is discontinuous due to a building or a roadside tree, from before a disaster occurs, as a location at which an obstruction has been detected on a road to be suppressed. Moreover, since image analysis can be performed centered on an image of a location at which a change in a characteristic point has been detected, promptness of image analysis can be ensured.

An output section 11C outputs a road for which no obstruction is detected by the detection section 11B as a traversable road. Moreover, in a case in which the output section 11C outputs plural roads within the target area as roads that are traversable, the output section 11C preferentially presents a road with a highest travel history, based on the travel history after a disaster occurs, of vehicles having a size corresponding to the size of the vehicle 20 that is used by the user, for roads of the target area. As an example, when a request from a user for road information of a road that is traversable is received at the onboard unit 50 in a case of the occurrence of a disaster, the onboard unit 50 transmits vehicle type information for the vehicle 20 to the server 10. The output section 11C identifies the size of the vehicle 20 used by the user based on the vehicle type information, and refers to the travel history of each road based on the travel histories of vehicles having the corresponding vehicle size. Note that the travel histories of vehicles corresponding to the size of the vehicle 20 used by the user are the travel histories of vehicles of the same size as the vehicle used by the user or the travel histories of vehicles of a larger size than the vehicle used by the user.

The output section 11C preferentially outputs a road with a highest travel history. This enables a user who has checked the output information to easily select a road that has a travel history of vehicles having a size that corresponds to the size of the host vehicle. The output section 11C transmits the information output via the network N to the onboard unit 50 of the user.

Figure 4:
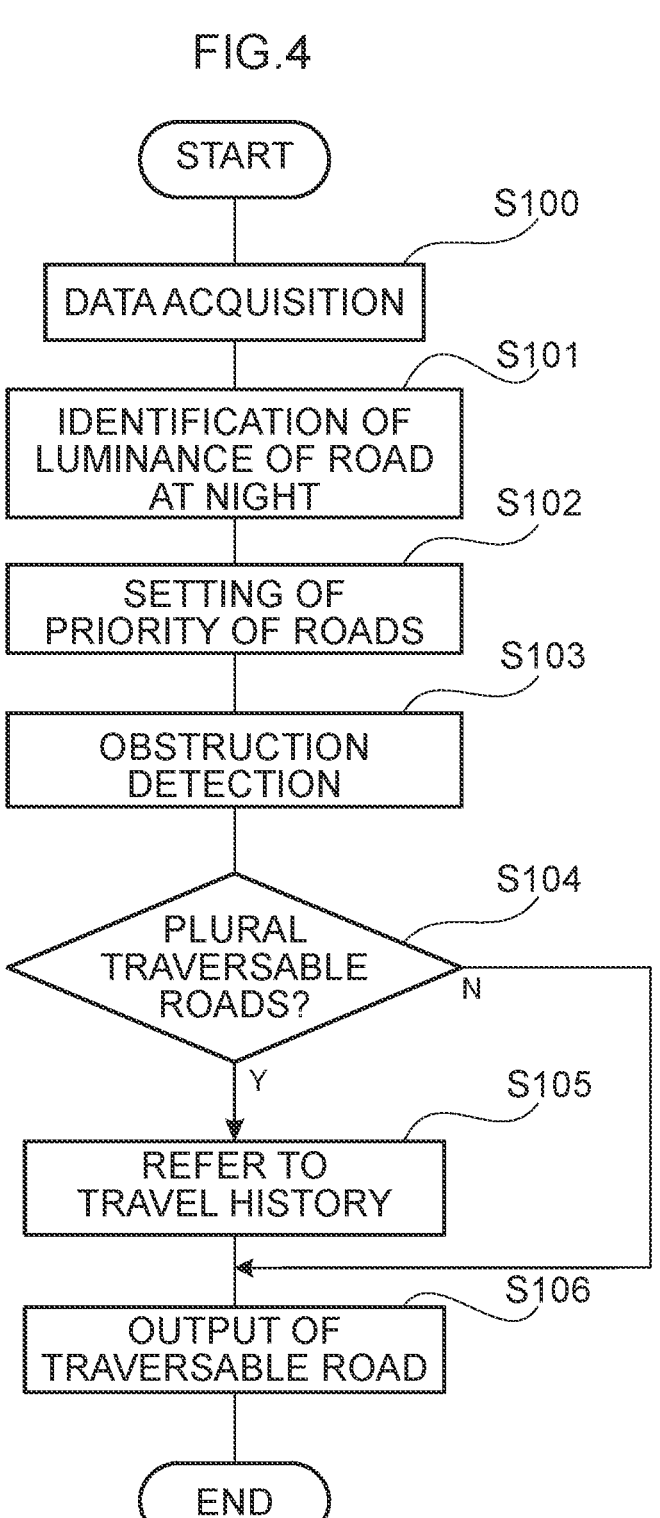
FIG. 4 is a flowchart illustrating a flow of output processing.

FIG. 4 is a flowchart illustrating a flow of output processing in which the server 10 outputs, to a user, road information of a road that is traversable. As an example, when a request from a user for road information of a road that is traversable is received at the onboard unit 50, the user request is received by the server 10 via the onboard unit 50, and output processing is executed. The output processing is performed by the CPU 11 reading the program 14A from the storage section 14, and loading and executing the program 14A in the RAM 13.

At step S100 illustrated in FIG. 4, the CPU 11 acquires various data using the functionality of the acquisition section 11A. More specifically, the CPU 11 acquires disaster information that is transmitted from the disaster information center 30, user information that is transmitted from the onboard unit 50, and various data including a satellite image of the ground captured by the artificial satellite 40, map data, and travel history of a road. The CPU 11 then proceeds to the processing of step S101.

At step S101, the CPU 11 identifies the luminance, which indicates a road brightness at night, for the target area based on the acquired disaster information. More specifically, based on the satellite image captured at night, the CPU 11 identifies the luminance, which indicates a road brightness, with respect to the roads in the target area based on the disaster information. The CPU 11 then proceeds to the processing of step S102.

At step S102, the CPU 11 sets a priority in accordance with the luminance, which indicates a road brightness, with respect to roads in the target area. More specifically, the lower the luminance, which indicates a road brightness, of a road, the higher the priority is set for the road. The CPU 11 then proceeds to the processing of step S103.

At step S103, the CPU 11 detects obstructions on roads which relate to passage of a vehicle, in order from a highest priority road that is set in accordance with luminance, for roads in the target area. The CPU 11 compares the satellite image captured before a disaster occurs and the satellite image captured after the disaster occurs with each other to detect an obstruction on the road in the target area. The CPU 11 then proceeds to the processing of step S104.

At step S104, the CPU 11 recognizes a road for which no obstruction is detected as a traversable road, and determines whether or not there are plural traversable roads. In a case in which there are plural traversable roads, the determination of step S104 is affirmative, and the CPU 11 proceeds to the processing of step S105. On the other hand, in a case in which the number of traversable roads is one or less, the determination of step S104 is negative, and the CPU 11 proceeds to the processing of step S106.

At step S105, the CPU 11 sets priorities for plural traversable roads in accordance with travel histories following a disaster. More specifically, the CPU 11 acquires travel histories after the occurrence of a disaster of vehicles having a size that corresponds to the size of the vehicle that is used by the user for plural roads determined to be traversable, and sets a priority for proposing to the user in accordance with the acquired travel histories. Note that in a case in which there is no travel history, the priorities of the plural roads are set to be the same. The CPU 11 then proceeds to the processing of step S106.

At step S106, the CPU 11 outputs road information of a road that is traversable. In a case in which the processing of step S105 has been acquired at this time, roads with highest travel histories are preferentially output for plural traversable roads. Note that an output mode may be a mode in which plural roads are displayed in a list in order of priority, or a mode in which one road with the highest priority is output. The CPU 11 transmits the output information to the onboard unit 50, and ends the output processing.

Operation and Effects

As described above, the server 10 according to the present exemplary embodiments acquires a satellite image of the ground, which is captured by an artificial satellite 40, for a target area based on disaster information. Then, based on the acquired satellite image, an obstruction on a road which relates to passage of a vehicle is detected, and a road for which no obstruction is detected is output as a traversable road. As a result, a traversable road can be promptly proposed based on an overhead view of a road condition, even at a timing when a travel history for the target area cannot be obtained at the time of a disaster.

The server 10 acquires a satellite image captured before a disaster occurs and a satellite image captured after the disaster occurs, for the target area. The satellite image captured before a disaster occurs and the satellite image captured after the disaster occurs are compared to detect an obstruction on a road which relates to passage of the vehicle. This enables a change in a road condition before and after the occurrence of a disaster to be accurately captured, thereby enabling a more accurate proposal of a traversable road.

The server 10 acquires a satellite image captured during the daytime for the target area and a satellite image captured at night for the target area. Then, based on the satellite image captured at night, a priority in accordance with a luminance, which indicates a road brightness, with respect to roads of the target area is set, and the based on the satellite image captured during the daytime, obstructions on roads which relate to passage of the vehicle are detected, in order from a highest priority road. Note that on a road with low luminance in a satellite image captured at night, there may be less road lighting, and it is assumed that there is a high risk of a secondary disaster occurring while driving at night without being aware of an obstruction on the road. Accordingly, in the present exemplary embodiments, the priority is set high for roads with low luminance, and obstructions on roads which relate to passage of the vehicle are preferentially detected, enabling the risk of secondary disasters during a disaster to be effectively reduced.

The server 10 outputs a traversable road in response to a request from a user. Here, the server 10 acquires travel histories for roads in the target area of vehicles having a size that corresponds to the size of the vehicle. Moreover, in a case in which plural roads are output as traversable roads as a result of detection of an obstruction on a road which relates to passage of the vehicle, based on travel histories after a disaster occurs of vehicles having a size that corresponds to the size of the vehicle 20 used by the user, the server 10 preferentially presents a road with a highest travel history of vehicles having a size that corresponds to the size of the vehicle used by the user. This enables the user to easily select a road that has a travel history of vehicles having a size that corresponds to the size of the host vehicle. As a result, for example, users using transportation trucks are prevented from having unexpected stops due to a change in road conditions due to a disaster, thereby enabling the distribution of goods to be easily ensured during the time of a disaster.

Supplementary Explanation

Although in the above-described exemplary embodiments, a request from a user for traversable road information is transmitted to the server 10 by the onboard unit 50, there is no limitation thereto, and the request may be updated so as to be transmitted from a user terminal such as a personal computer or a smartphone to the server 10. Moreover, in this case, the traversable road information output by the server 10 may be transmitted to the user terminal.

Note that the output processing executed by the CPU 11 reading and executing software (a program) in the above-described exemplary embodiments may be executed by various types of processor other than a CPU. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors (for example, plural FPGAs, or a combination of a CPU and an FPGA, or the like). Moreover, a hardware configuration of the various processors is specifically formed as an electric circuit combining circuit elements such as semiconductor elements.

Although explanation has been given regarding an example in which the providing program 14A is stored (installed) in advance in the storage section 14 in the above-described exemplary embodiments, there is no limitation thereto. The providing program 14A may be provided in a format recorded on a recording medium such as compact disc read only memory (CD-ROM), digital versatile disc read only memory (DVD-ROM), or universal serial bus (USB) memory. Alternatively, the program 14A may be provided in a format downloadable from an external device over the network N.

What is claimed is:

1. An information processing device comprising:
at least one processor, wherein the at least one processor is configured to:
acquire disaster information resulting from receiving a request from a user via an onboard unit of a user terminal;
acquire a travel history of vehicles having a size of a vehicle used by the user, for roads of a target area;
acquire a satellite image of the ground, which is captured by an artificial satellite, for the target area based on the disaster information;
based on the satellite image, detect an obstruction on a road which relates to passage of the vehicle and including flooding of the road;
output a road for which no obstruction is detected as a traversable road;
acquire a satellite image captured during daytime and a satellite image captured at night, for the target area;
based on the satellite image captured at night, set a priority in accordance with a luminance, which indicates a road brightness, with respect to the roads of the target area, the priority increases as the luminance decreases;
based on the satellite image captured during daytime, detect obstructions on the roads which relate to passage of the vehicle, in order from a highest priority road;
provide the user with information related to the traversable road via the onboard unit or the user terminal;
transmit, in response to a request from the user terminal, a proposal of the traversable road based on the information related to the traversable road;
output the traversable road in accordance with the request from the user terminal;

in a case in which a plurality of roads are output as traversable roads, based on the travel history after the disaster occurs, preferentially output a road with a highest travel history of vehicles having the size of the vehicle used by the user;
in a case in which the plurality of roads that are traversable roads is one or less, output road information in response to the plurality of roads that are traversable roads is one or less;
display the plurality of roads that are traversable roads in a list in order of priority in accordance with an output mode;
receive a selection of the proposal of the traversable road; and
control the vehicle to travel in accordance with the selection of the proposal of the traversable road.

2. The information processing device according to claim 1, wherein the at least one processor is configured to:
acquire a satellite image captured before a disaster occurs and a satellite image captured after the disaster occurs, for the target area; and
detect the obstruction on the road which relates to passage of the vehicle by comparing the satellite image captured before the disaster occurs and the satellite image captured after the disaster occurs.

3. An information processing method comprising:
acquiring disaster information resulting from receiving a request from a user via an onboard unit of a user terminal;
acquiring a travel history of vehicles having a size of a vehicle used by the user, for roads of a target area;
acquiring a satellite image of the ground, which is captured by an artificial satellite, for the target area based on the disaster information;
based on the satellite image, detecting an obstruction on a road which relates to passage of the vehicle and including flooding of the road;
outputting a road for which no obstruction is detected as a traversable road;
acquiring a satellite image captured during daytime and a satellite image captured at night, for the target area;
based on the satellite image captured at night, setting a priority in accordance with a luminance, which indicates a road brightness, with respect to the roads of the target area, the priority increases as the luminance decreases;
based on the satellite image captured during daytime, detecting obstructions on the roads which relate to passage of the vehicle, in order from a highest priority road;
providing the user with information related to the traversable road via the onboard unit or the user terminal;
transmitting, in response to a request from the user terminal, a proposal of the traversable road based on the information related to the traversable road;
outputting the traversable road in accordance with the request from the user terminal;
in a case in which a plurality of roads are output as traversable roads, based on the travel history after the disaster occurs, preferentially outputting a road with a highest travel history of vehicles having the size of the vehicle used by the user;
in a case in which the plurality of roads that are traversable roads is one or less, outputting road information in response to the plurality of roads that are traversable roads is one or less;

displaying the plurality of roads that are traversable roads in a list in order of priority in accordance with an output mode;

receiving a selection of the proposal of the traversable road; and controlling the vehicle to travel in accordance with the selection of the proposal of the traversable road.

\*  \*  \*  \*  \*